(12) United States Patent
Hamminga et al.

(10) Patent No.: US 11,189,935 B2
(45) Date of Patent: Nov. 30, 2021

(54) CAVITY SLOTTED-WAVEGUIDE ANTENNA ARRAY, A METHOD OF MANUFACTURING A CAVITY SLOTTED-WAVEGUIDE ANTENNA ARRAY, AND A RADAR ANTENNA MODULE COMPRISING CAVITY SLOTTED-WAVEGUIDE ANTENNA ARRAYS

(71) Applicant: Robin Radar Facilities BV, The Hague (NL)

(72) Inventors: Siete Hamminga, Heemstede (NL); Rob Van Der Meer, Pijnacker (NL)

(73) Assignee: Robin Radar Facilities BV, The Hague (NL)

( * ) Notice: Subject to any disclaimer, the term of this patent is extended or adjusted under 35 U.S.C. 154(b) by 297 days.

(21) Appl. No.: 16/347,400

(22) PCT Filed: Nov. 3, 2017

(86) PCT No.: PCT/EP2017/078148
§ 371 (c)(1),
(2) Date: May 3, 2019

(87) PCT Pub. No.: WO2018/086998
PCT Pub. Date: May 17, 2018

(65) Prior Publication Data
US 2019/0305437 A1 Oct. 3, 2019

(30) Foreign Application Priority Data

Nov. 8, 2016 (DK) .............................. PA201670879
Nov. 8, 2016 (DK) .............................. PA201670881
Nov. 8, 2016 (DK) .............................. PA201670882

(51) Int. Cl.
*H01Q 21/00* (2006.01)
*H01Q 13/02* (2006.01)
(Continued)

(52) U.S. Cl.
CPC ............. *H01Q 21/005* (2013.01); *H01Q 1/52* (2013.01); *H01Q 13/0233* (2013.01);
(Continued)

(58) Field of Classification Search
CPC ......................... H01Q 21/0043–21/005; H01Q 13/0233–13/22; H01Q 21/064
See application file for complete search history.

(56) References Cited

U.S. PATENT DOCUMENTS

| 6,429,825 | B1 | 8/2002 | Martek | |
| 6,995,724 | B2 * | 2/2006 | Teshirogi | H01Q 13/22 333/237 |

(Continued)

OTHER PUBLICATIONS

International Search Report, Application No. PCT/EP2017/078148, dated May 2, 2018, 4 pages.

*Primary Examiner* — Hasan Islam
(74) *Attorney, Agent, or Firm* — Ziegler IP Law Group, LLC

(57) ABSTRACT

A cavity slotted-waveguide antenna array has several waveguide columns disposed in parallel in a housing. Several of the waveguide columns being provided with cavity slots on the front side of the housing. The housing includes a front part secured to a rear part, with a rear portion of the waveguide columns being formed in the rear part, and with a front portion of the waveguide columns being formed in said front part. The waveguide columns can have a rectangular cross-section, with the columns defined by two opposing wide inner surfaces, a narrow inner back surface, and a narrow inner front surface, with the plurality of cavity slots extending from the front side of the housing to said narrow inner front surface. A signal probe is disposed in the columns. Conductive parallel plate blinds are conductively secured to the front side of the housing.

8 Claims, 8 Drawing Sheets

(51) Int. Cl.
*H01Q 13/18* (2006.01)
*H01Q 21/06* (2006.01)
*H01Q 13/22* (2006.01)
*H01Q 1/52* (2006.01)

(52) U.S. Cl.
CPC ............ *H01Q 13/18* (2013.01); *H01Q 13/22* (2013.01); *H01Q 21/064* (2013.01)

(56) References Cited

U.S. PATENT DOCUMENTS

| | | | |
|---|---|---|---|
| 9,379,446 B1 | 6/2016 | Schuss et al. | |
| 10,985,472 B2 * | 4/2021 | Moon | H01Q 21/245 |
| 2018/0301820 A1 * | 10/2018 | Bregman | H01Q 13/10 |

* cited by examiner

CAVITY SLOTTED-WAVEGUIDE ANTENNA ARRAY, A METHOD OF MANUFACTURING A CAVITY SLOTTED-WAVEGUIDE ANTENNA ARRAY, AND A RADAR ANTENNA MODULE COMPRISING CAVITY SLOTTED-WAVEGUIDE ANTENNA ARRAYS

TECHNICAL FIELD

The disclosure relates generally to antenna arrays for multi-beam antenna systems. In particular, the disclosure relates to a cavity slotted-waveguide antenna array and to a method of manufacturing a cavity slotted-waveguide antenna array. The disclosure further relates to a radar antenna module comprising one or more cavity slotted waveguide antenna arrays.

BACKGROUND

In the prior art, slotted-waveguide antennas, SWA, are well-known, where the waveguides may be arranged in an array of waveguides, such as a planar array of parallel waveguides. As the name suggests, slotted-waveguide antennas consist of lengths of waveguides with a multiple number of slots formed in the conducting walls of the waveguides. These slots introduce discontinuities in the conductor and interrupt the flow of current along the waveguide. Instead, the current must flow around the edges of the slots, causing them to act as dipole antennas.

The two basic types of SWAs are standing wave and traveling wave antennas. In a traveling wave SWA, the waveguide is built with matched loads or absorbers at the end, while in a standing wave SWA, the end of the waveguide is short-circuited.

Depending on the desired electric field polarization, the slots can be placed on either the narrow or broad wall of the waveguide. At the fundamental TE10 mode, longitudinal slots on the broad wall will produce a field with vertical polarization, while transverse slots on the narrow wall result in a horizontal field polarization.

For antenna systems used to detect small targets, such as birds, in a clutter rich environment, a horizontal polarization is preferred, which can be obtained by an array of waveguides with transverse slots on the narrow wall.

It would be advantageous to have an improved cavity slotted-waveguide antenna array for a multi-beam antenna, which antenna array is compact in size and has an improved manufacturability. A compact cavity slotted-waveguide antenna array could also advantageously be used as part of a compact radar antenna module.

SUMMARY

It is an object of the aspects of the disclosed embodiments to provide a cavity slotted-waveguide antenna array, which is compact in size and has an improved manufacturability.

According to a first aspect there is provided a cavity slotted-waveguide antenna array comprising:
an array of waveguide columns, which waveguide columns are disposed in parallel in a predetermined adjacent position with respect to one another in a housing, which housing has a front side and a rear side with several of the waveguide columns being provided with a plurality of cavity slots on the front side of the housing;
wherein the housing comprises a front part secured to a rear part, with a rear portion of the waveguide columns being formed in the rear part, and with a front portion of the waveguide columns being formed in the front part, which rear part is formed by a first one-piece metal element and which front part is formed by a second one-piece metal element.

By having the waveguide columns formed with a rear column portion in a first one-piece metal element and with a front column portion in the second one-piece metal element, there is provided a compact antenna array structure, which can be easily manufactured, and which is very stable with a high degree of stiffness, thereby maintaining the waveguide column measures needed for an efficient function of the antenna structure.

In a possible implementation form of the first aspect, the first one-piece metal element and/or the second one-piece metal element is machined from a single flat piece of metal or is cast in a die.

In a possible implementation form of the first aspect, the front part has contact surfaces laying in a single plane on a rear side of the front part, which contact surfaces abut matching contact surfaces laying in a single plane on a front side of the rear part. It is noted that the contact planes with the abutting contact surfaces of the front and rear parts can be arranged in the middle of the housing, but the contact planes may also be arranged closer to the front side than to the rear side of the housing, or closer to the rear side than to the front side of the housing.

In a possible implementation form of the first aspect, the rear column portion of each of the waveguides of the antenna array is formed in the first one-piece metal element, and the front column portion of each of the waveguides of the antenna array is formed in the second one-piece metal element.

By using two one-piece metal plates only for forming the waveguide columns, a very stable antenna is obtained.

In a possible implementation form of the first aspect, the waveguide columns are waveguides with a rectangular cross-section, with each or at least part of the columns being defined by first and second opposing wide inner surfaces, a narrow inner back surface, and a narrow inner front surface, with the plurality of cavity slots extending from the front side of the housing to the narrow inner front surface. In a possible implementation form of the first aspect, the front side of the housing has front recesses defining outer surfaces of first and second sidewalls of the front column portions. In a possible implementation form of the first aspect, the narrow inner front surface and the front side of the housing define a narrow front wall holding the cavity slots. In a possible implementation form of the first aspect, the cavity slots are narrow walled slots. In a possible implementation form of the first aspect, the cavity slots are transverse narrow walled slots reaching from the first wide inner surface to the second wide inner surface.

By having the slots in the narrow wall of the waveguide columns, a horizontal field polarisation can be obtained.

In a possible implementation form of the first aspect, each cavity slot has an associated angular displacement to the longitudinal direction of the waveguide columns.

In a possible implementation form of the first aspect, the slots of each or at least part of the one or more waveguide columns are arranged as cavity slot pairs. Each cavity slot pair may include upper and lower slots, each slot having an associated angular displacement to the longitudinal direction of the waveguide columns, and the angular displacements of the upper and lower slots are substantially equivalent to one another, but in an opposite orientation.

In a possible implementation form of the first aspect, each of the waveguide columns are dimensioned for radiating and/or receiving electromagnetic waves of a predetermined free-space wavelength $\lambda_0$, and for having a corresponding guided signal wavelength $\lambda_g$ propagating within the columns.

In a possible implementation form of the first aspect, the cavity slotted-waveguide antenna array comprises a signal probe operably disposed at the bottom of the rear column portion in each or at least some of the waveguide columns for emitting and/or receiving an electromagnetic signal having a free-space wavelength of $\lambda_0$, which signal propagates within the column holding the signal probe as electromagnetic waves with a corresponding guided signal wavelength $\lambda_g$.

When the waveguide columns are narrow walled columns, the arrangement of the signal probe at the bottom of the column will be at the narrow inner back surface, resulting in a so-called "magnetic feed" of the electromagnetic signal.

In a possible implementation form of the first aspect, each or at least part of the signal probes are loop probes with a loop or an open ended loop for emitting and/or receiving the electromagnetic signal.

In a possible implementation form of the first aspect, the distance between the longitudinal axes of two adjacent waveguide columns is at least one half the free space signal wavelength, such as at least 20, 25 or 30% larger than half the free space signal wavelength.

In a possible implementation form of the first aspect, then for each or at least part of the waveguide columns, the centres of two neighbouring slots are separated by a distance substantially equal to half the guided signal wavelength $\lambda_g$.

In a possible implementation form of the first aspect, the same number of slots are formed in each of the front column portions for which slots are formed. Each of the probe holes may be arranged at the same distance to a first end part of the corresponding rear column portion. The first and second sidewalls may be of equal thickness, and the front column portions may have a narrow front wall thickness equal to the thickness of the sidewalls of the front column portions.

In a possible implementation form of the first aspect, the height of the wide inner surfaces is 20 mm and the width of the narrow inner back and front surfaces is 10 mm.

In a possible implementation form of the first aspect, the rear column portions are formed in a solid metal plate having a thickness in the range of 10-14 mm, such as 12 mm, and the front column portions are formed in a solid metal plate having a thickness in the range of 10-14 mm, such as 12 mm. In a possible implementation form of the first aspect, at least part of the front column portions have parallel first and second sidewalls and a narrow front wall, where each of the walls has a thickness of about 2 mm.

In an embodiment the cavity slotted-waveguide antenna array of the first aspect comprises several conductive parallel plate blinds conductively secured to the front side of the housing, which front side holds the cavity slots, which plate blinds are arranged substantially perpendicular to the longitudinal direction of the waveguide columns. The plate blinds are vertical blinds or baffles for reducing electromagnetic power radiated in the cross-polarization, that is blinds or baffles for cross-polarization suppression.

In a possible implementation form of the first aspect, two adjacent plate blinds are disposed with a single waveguide slot in between, and the spacing between the centres of adjacent plate blinds is substantially equal to half the guided signal wavelength.

In a possible implementation form of the first aspect, each or at least part of the plate blinds comprises two parallel outer surfaces, a first and a second outer surface, which outer surfaces are arranged substantially perpendicular to the longitudinal direction of the waveguide columns and substantial perpendicular to the front side of the housing. The distance between the first and second outer surfaces may be in between one third to one half of the free space signal wavelength. The plate blinds may be substantially U-shaped with two parallel side plates and a bottom plate.

In a possible implementation form of the first aspect, each or at least part of the plate blinds are secured to the front side of the housing by a sliding dovetail joint. The tail of a dovetail joint may be formed at a bottom part of the plate blind and the socket of the dovetail joint may be formed in the front side of the housing.

According to the first aspect there is also provided a method of manufacturing an array of slotted cavity columns for use in a planar cavity slotted-waveguide antenna array, which method comprises:

forming a plurality of longitudinally extending parallel and equidistantly arranged open rear column portions of equal dimensions in a first one-piece metal element;

forming a plurality of longitudinally extending parallel and equidistantly arranged open front column portions of equal dimensions in a second one-piece metal element, which front column portions have a width and a length equal to the width and length of the rear column portions and are arranged with a spacing equal to the spacing of the rear column portions;

forming a plurality of slots in each or at least part of the front column portions, each slot extending from the bottom of the corresponding front column portion to an upper surface of the second metal element; and connecting the first and the second metal elements together with the openings of the rear column portions facing the openings of the front column portions, whereby the rear and front column portions form a number of rectangular parallel waveguide columns.

In a possible implementation form the method of the first aspect further comprises forming a plurality of longitudinally extending parallel upper recesses in the second plate, which upper recesses extend into the second plate from the upper surface of the second plate, which upper recesses define first and second sidewalls of an upper part of each or at least part of the upper column portions.

In a possible implementation form of the method of the first aspect, the first one-piece metal element and/or the second one-piece metal element is a single flat piece of metal.

In a possible implementation form the method of the first aspect further comprises forming a plurality of longitudinally extending parallel front recesses in the second metal element, which front recesses extend into the second metal element from the upper surface of the second metal element, and which front recesses define first and second sidewalls of a front part of each or at least part of the front column portions.

In a possible implementation form the method of the first aspect further comprises forming a probe hole within each or at least part of the rear column portions, each probe hole extending from the bottom of the corresponding rear column portion to a bottom surface of the first metal element.

In a possible implementation form of the method of the first aspect, formation of the rear column portions in the first metal element, formation of the front column portions in the second metal element, and formation of the slots are performed by use of milling.

In a possible implementation form of the method of the first aspect, the formation of the front recesses in the second metal element and formation of the probe holes are performed by use of milling.

In a possible implementation form of the method of the first aspect, the rear column portions are formed in a first, solid metal plate having a thickness in the range of 10-14 mm, such as 12 mm, and the front column portions are formed in a second, solid metal plate having a thickness in the range of 10-14 mm, such as 12 mm.

In a possible implementation form of the method of the first aspect, the same number of slots are formed in each of the front column portions for which slots are formed. Each of the probe holes may be arranged at the same distance to a first end part of the corresponding rear column portion. The first and second sidewalls may be of equal thickness, and the front column portions may have a narrow front wall thickness equal to the thickness of the sidewalls of the front column portions.

It is an object of the aspects of the present disclosure to provide a cavity slotted-waveguide antenna array with loop probes, wherein the design of the array provides a precise alignment of the probes.

According to a second aspect there is provided a cavity slotted-waveguide antenna array comprising:

an array of waveguide columns disposed in parallel in a predetermined adjacent position with respect to one another in a housing having a front side and a rear side with several of the waveguide columns being provided with a plurality of cavity slots on the front side of the housing, which waveguide columns have upper and lower ends, and which waveguide columns are waveguides with a rectangular cross section, with each or at least part of the columns being defined by two opposing wide inner surfaces, a narrow inner back surface, and a narrow inner front surface, with the plurality of cavity slots extending from the front side of the housing to the narrow inner front surface; and a signal probe operably disposed in each or at least part of the columns for emitting and/or receiving an electromagnetic signal;

wherein each or at least part of the signal probes are loop probes with a loop or an open ended loop disposed at the narrow inner back surface opposite and facing the narrow inner front surface of the waveguide column holding the loop probe.

In a possible implementation form of the second aspect, each or at least part of waveguide columns has a probe hole formed in a waveguide bottom wall being defined by the narrow inner back surface of the waveguide column and the rear side of the housing with an outer back surface of the waveguide bottom wall being defined by the rear side of the housing, and wherein the signal probes have a probe connection part opposite the loop or open ended loop, which probe connection part extends through the probe hole of the waveguide bottom wall.

In a possible implementation form of the second aspect, the antenna array further comprises an enclosure part holding a number of surrounding parts corresponding to the number of probe holes, each surrounding part having an outer diameter substantially equal to an inner diameter of the probe holes, and each surrounding part holding a probe connection part of the signal probe with a loop or open ended loop extending outwards from the surrounding part, wherein the enclosure part is connected to the rear side of the housing with the surrounding parts extending into the probe holes with the loops or open ended loops further extending into the interior of the waveguide columns.

In a possible implementation form of the second aspect, there is provided a cavity slotted-waveguide antenna array comprising:

an array of waveguide columns disposed in parallel in a predetermined adjacent position with respect to one another in a housing having a front side and a rear side with several of the waveguide columns being provided with a plurality of cavity slots on the front side of the housing, which waveguide columns have upper and lower ends, and which waveguide columns are waveguides with a rectangular cross section, with each or at least part of the columns being defined by two opposing wide inner surfaces, a narrow inner back surface, and a narrow inner front surface, with the plurality of cavity slots extending from the front side of the housing to the narrow inner front surface, and wherein each or at least part of waveguide columns has a probe hole formed in a waveguide bottom wall being defined by the narrow inner back surface of the waveguide column and the rear side of the housing with an outer back surface of the waveguide bottom wall being defined by the rear side of the housing; and an enclosure part holding a number of surrounding parts corresponding to the number of probe holes, each surrounding part having an outer diameter substantially equal to an inner diameter of the probe holes, and each surrounding part holding a probe connection part of a signal probe being a loop probe having a loop or open ended loop extending outwards from the surrounding part; wherein the enclosure part is connected to the rear side of the housing with the surrounding parts extending into the probe holes with the loops or open ended loops further extending into the interior of the waveguide columns.

By having the probes arranged within the enclosure part there is provided a solution for an easy and precise alignment of the signal probes within the waveguide columns.

In a possible implementation form of the second aspect, the signal probes are formed of an electrically conductive material, and are electrically non-conductively secured to the columns.

In a possible implementation form of the second aspect, the signal probes are operably disposed in each or at least part of the columns for emitting and/or receiving an electromagnetic signal having a free-space wavelength of $\lambda_0$, which signal propagates within the column holding the signal probe as electromagnetic waves with a corresponding guided signal wavelength $\lambda_g$.

In a possible implementation form of the second aspect, the loop or open ended loop of a loop probe at least partly forms a loop circle having a circumference in the range of ⅓ to ⅔, such as about ½ of the guided signal wavelength $\lambda_g$.

In a possible implementation form of the second aspect, an electrically non-conductive material surrounds the probe connection part extending within the waveguide bottom wall. In a possible implementation form of the second aspect, the electrical non-conductive material comprises or is made of Polyether Ether Ketone, PEEK, plastic.

In a possible implementation form of the second aspect, the enclosure part holds a printed circuit board, PCB, and an end part of the connection part of each of the loop probes is electrically connected to a corresponding electrical conductive signal trace provided at the printed circuit board.

In a possible implementation form of the second aspect, the PCB has a bottom surface facing the enclosure part, which enclosure part is formed of an electrical conductive material, such as aluminum, and which PCB bottom surface holds electrical conductive ground traces or part/parts providing an electrical connection to the enclosure part.

In a possible implementation form of the second aspect, the PCB signal traces, to which the loop probes are electrical connected, are provided at a front surface of the PCB, which front surface faces away from the outer back surface of the waveguide bottom wall.

In a possible implementation form of the second aspect, each PCB signal trace corresponding to a loop probe has a first trace end soldered to the end part of the loop probe. In a possible implementation form of the second aspect, each of the PCB signal traces is a copper trace with a characteristic impedance of 50 Ohm.

In a possible implementation form of the second aspect, the PCB holds electronic radio frequency transmit or receive circuitry electrically connected to the loop probes via the PCB signal traces.

In a possible implementation form of the second aspect, a second end of each the PCB signal traces is connected to the radio frequency transmit or receive circuitry.

In a possible implementation form of the second aspect, each or at least part of the loop probes are disposed proximal to the lower end of the column holding the probe.

In a possible implementation form of the second aspect, the loop or open ended loop of the loop probes is arranged in a direction perpendicular to the longitudinal direction of the waveguide columns.

In a possible implementation form of the second aspect, at least one of the one or more columns has an absorbing load at its upper end to enable the column to function in a travelling wave mode.

In a possible implementation form of the second aspect, the front side of the housing has front recesses defining outer surfaces of sidewalls of the front column portions. In and embodiment of the second aspect, the narrow inner front surface and the front side of the housing define a narrow front wall holding the cavity slots. In a possible implementation form of the second aspect, the cavity slots are narrow walled slots. In a possible implementation form of the second aspect, the cavity slots are transverse narrow walled slots reaching from the first wide inner surface to the second wide inner surface.

In a possible implementation form of the second aspect, each cavity slot has an associated angular displacement to the longitudinal direction of the waveguide columns.

In a possible implementation form of the second aspect, the slots of each or at least part of the one or more waveguide columns are arranged as cavity slot pairs. Each cavity slot pair may include upper and lower slots, each slot having an associated angular displacement to the longitudinal direction of the waveguide columns, and the angular displacements of the upper and lower slots are substantially equivalent to one another, but in an opposite orientation.

In a possible implementation form the cavity slotted-waveguide antenna array of the second aspect comprises several conductive parallel plate blinds conductively secured to the front side of the housing, which front side holds the cavity slots, which plate blinds are arranged substantially perpendicular to the longitudinal direction of the waveguide columns.

In a possible implementation form of the second aspect, two adjacent plate blinds are disposed with a single waveguide slot in between, and the spacing between the centres of adjacent plate blinds is substantially equal to half the guided signal wavelength.

In a possible implementation form of the second aspect, each or at least part of the plate blinds comprises two parallel outer surfaces, a first and a second outer surface, which outer surfaces are arranged substantially perpendicular to the longitudinal direction of the waveguide columns and substantial perpendicular to the front side of the housing. The distance between the first and second outer surfaces may be in between one third to one-half of the free space signal wavelength. The plate blinds may be substantially U-shaped with two parallel side plates and a bottom plate.

In a possible implementation form of the second aspect, each or at least part of the plate blinds are secured to the front side of the housing by a sliding dovetail joint. The tail of a dovetail joint may be formed at a bottom part of the plate blind and the socket of the dovetail joint may be formed in the front side of the housing.

According to the second aspect, there is also provided a method of arranging a number of signal probes within a cavity slotted-waveguide antenna array, which method comprises:

providing an array of waveguide columns disposed in parallel in a predetermined adjacent position with respect to one another in a housing having a front side and a rear side with several of the waveguide columns being provided with a plurality of cavity slots on the front side of the housing, which waveguide columns have upper and lower ends, and which waveguide columns are waveguides with a rectangular cross section, with each or at least part of the columns being defined by two opposing wide inner surfaces, a narrow inner back surface, and a narrow inner front surface, with the plurality of cavity slots extending from the front side of the housing to the narrow inner front surface, and wherein each or at least part of waveguide columns has a probe hole formed in a waveguide bottom wall being defined by the narrow inner back surface of the waveguide column and the rear side of the housing with an outer back surface of the waveguide bottom wall being defined by the rear side of the housing;

providing an enclosure part holding a number of surrounding parts corresponding to the number of probe holes, each surrounding part having an outer diameter substantially equal to an inner diameter of the probe holes, and each surrounding part holding a probe connection part of a signal probe being a loop probe having a loop or open ended loop extending outwards from the surrounding part; and connecting the enclosure part to the rear side of the housing with the surrounding parts extending into the probe holes, and with the loops or open ended loops further extending into the interior of the waveguide columns.

In a possible implementation form of the method of the second aspect, an electrically non-conductive material surrounds the probe connection part extending through the surrounding part. In a possible implementation form of the method of the second aspect, the electrical non-conductive material comprises or is made of Polyether Ether Ketone, PEEK, plastic.

In a possible implementation form of the method of the second aspect, the enclosure part holds a printed circuit board, PCB, and an end part of the connection part of each of the loop probes is electrically connected to a corresponding electrical conductive signal trace provided at the printed circuit board.

In a possible implementation form of the method of the second aspect, the PCB has a bottom surface facing the enclosure part, which enclosure part is formed of an electrical conductive material, such as aluminum, and which PCB bottom surface holds electrical conductive ground traces or part/parts providing an electrical connection to the enclosure part.

In a possible implementation form of the method of the second aspect, the PCB signal traces, to which the loop probes are electrical connected, are provided at a front surface of the PCB, which front surface faces away from the outer back surface of the waveguide bottom wall.

In a possible implementation form of the method of the second aspect, the loop probes, which may be open ended loop probes, are disposed proximal to the lower end of the column holding the probe.

In a possible implementation form of the method of the second aspect, the loop or open ended loop of the loop probes is arranged in a direction perpendicular to the longitudinal direction of the waveguide columns.

Ideally, the vertical polarized components from the cavity slots of a cavity-slotted waveguide antenna should be fully cancelled out, leaving only the horizontal polarized components. The remaining vertical polarized components, also named the cross-polarization radiation pattern, can be reduced by use of conductive plate blinds arranged between the cavity slots.

It is an object of the invention to provide a cavity slotted-waveguide antenna array, which is designed for reducing the cross-polarization radiation pattern.

Thus, according to a third aspect there is provided a cavity slotted-waveguide antenna array comprising:

an array of waveguide columns disposed in parallel in a predetermined adjacent position with respect to one another in a housing having a front side and a rear side with several of the waveguide columns being provided with a plurality of cavity slots on the front side of the housing, which waveguide columns have upper and lower ends, and which waveguide columns are waveguides with a rectangular cross section, with each or at least part of the columns being defined by first and second opposing wide inner surfaces, a narrow inner back surface, and a narrow inner front surface, with the plurality of cavity slots extending from the front side of the housing to the narrow inner front surface;

a signal probe operably disposed in each or at least part of the columns for emitting and/or receiving an electromagnetic signal having a free-space wavelength of $\lambda_0$, which signal propagates within the column holding the signal probe as electromagnetic waves with a corresponding guided signal wavelength $\lambda_g$; and several conductive parallel plate blinds conductively secured to the front side of the housing, which plate blinds are arranged substantially perpendicular to the longitudinal direction of the waveguide columns;

wherein each or at least part of the plate blinds comprises a first and a second outer surface with the first outer surface being parallel to the second outer surface and with a distance between the first and second outer surfaces being in the range of one third to one half of the free space signal wavelength $\lambda_0$.

In a possible implementation form of the third aspect, the first and second parallel outer surfaces of the plate blinds are arranged substantial perpendicular to the front side of the housing.

In a possible implementation form of the third aspect, the height of the first and second parallel outer surfaces of the plate blinds is in the range of 20-60% of the free space signal wavelength $\lambda_0$, such as about half the free space signal wavelength $\lambda_0$.

In a possible implementation form of the third aspect, two adjacent plate blinds are disposed with a single waveguide slot in between, and the spacing between the centres of adjacent plate blinds is substantially equal to half the guided signal wavelength $\lambda_g$.

In a possible implementation form of the third aspect, each or at least part of the plate blinds having first and second parallel outer surfaces are substantially U-shaped with two parallel side plates and a bottom plate.

In a possible implementation form of the third aspect, the U-shaped plate blinds are secured to the front side of the housing by a sliding dovetail joint.

In a possible implementation form of the third aspect, the tail of a dovetail joint is formed at a bottom part of a U-shaped plate blind and the socket of the dovetail joint is formed in the front side of the housing.

In a possible implementation form of the third aspect, the cavity slots are narrow walled slots. In a possible implementation form of the third aspect, the cavity slots are transverse narrow walled slots reaching from the first wide inner surface to the second wide inner surface.

In a possible implementation form of the third aspect, each cavity slot has an associated angular displacement to the longitudinal direction of the waveguide columns.

In a possible implementation form of the third aspect, the slots of each or at least part of the one or more waveguide columns are arranged as cavity slot pairs. Each cavity slot pair may include upper and lower slots, each slot having an associated angular displacement to the longitudinal direction of the waveguide columns, and the angular displacements of the upper and lower slots are substantially equivalent to one another, but in an opposite orientation.

In a possible implementation form of the third aspect, each or at least part of the signal probes are loop probes with a loop disposed at the narrow inner back surface opposite and facing the narrow inner front surface of the waveguide column holding the loop probe. The loop of the loop probes may be arranged in a direction perpendicular to the longitudinal direction of the waveguide columns. The loop probes may be disposed proximal to the lower end of the column holding the probe.

In a possible implementation form of the third aspect, each or at least part of the signal probes are open ended loop probes with an open ended loop disposed at the narrow inner back surface opposite and facing the narrow inner front surface of the waveguide column holding the loop probe.

It should be understood that the antenna arrays of the first aspect may include the possible implementation forms of the arrays of the second and/or third aspects, which implementation forms have not already been included in first aspect. Also, the antenna arrays of the second aspect may include the possible implementation forms of the arrays of the first and/or third aspects, which implementation forms have not already been included in the second aspect. Similarly, the antenna arrays of the third aspect may include the possible implementations forms of the arrays of the first and/or second aspects, which implementation forms have not already been included for the third aspect.

It would be advantageous to have an improved and compact radar antenna module comprising both radiating and receiving cavity slotted-waveguide antenna arrays, to thereby act both as a radiating and a receiving antenna. It would also be advantageous to have an antenna module covering a high scanning range in elevation.

According to a fourth aspect there is provided a radar antenna module comprising:

one or more planar radiating narrow sided cavity slotted-waveguide antenna arrays configured for radiating horizontal polarized electromagnetic waves; and one or more planar receiving narrow sided cavity slotted-waveguide antenna arrays configured for receiving horizontal polarized electromagnetic waves;

wherein each planar slotted-waveguide antenna array comprises several waveguide columns disposed in a parallel and adjacent position with respect to one another in a housing, which housing has a front side and a rear side with the waveguide columns being provided with a plurality of cavity slots on the front side of the housing; and wherein the radiating and receiving antenna arrays are arranged with the waveguide columns of the radiating antenna arrays disposed in a parallel position to the waveguide columns of the receiving antenna arrays.

In a possible implementation form of the fourth aspect, the waveguide columns of the radiating and receiving antenna arrays are of equal length.

In a possible implementation form of the fourth aspect, the radiating and receiving antenna arrays are arranged with the longitudinal direction of the waveguide columns extending in a single horizontal direction.

In a possible implementation form of the fourth aspect, the radar antenna module is configured for rotation about a vertical axis of rotation.

In a possible implementation form of the fourth aspect, the rear side of the housing of each of the one or more radiating antenna arrays faces the axis of rotation, and the cavity slots of the front side of the housing of each of the radiating antenna arrays face away from the axis of rotation.

In a possible implementation form of the fourth aspect, the front side and the cavity slots of the housings of the radiating and receiving antenna arrays face one or more directions with each of the directions having a component in the same horizontal direction.

In a possible implementation form of the fourth aspect, the cavity slots on the front side of the housing(s) of one or more radiating antenna arrays are arranged in a single radiating plane.

In a possible implementation form of the fourth aspect, the cavity slots, which are arranged in the single radiating plane, face a substantially horizontal direction.

In a possible implementation form of the fourth aspect, the single radiating plane extends in the vertical direction.

In a possible implementation form of the fourth aspect, the one or more radiating antenna arrays, which have the cavity slots on the front side of the housing(s) arranged in the single radiating plane, comprise a total of 24 waveguide columns.

In a possible implementation form of the fourth aspect, the cavity slots on the front side of the housing(s) of one or more first receiving array(s) are arranged in a partially upwards facing side of a single, first receiving plane.

In a possible implementation form of the fourth aspect, the partially upwards facing side of the first receiving plane faces a first, slightly upwards inclined direction.

In a possible implementation form of the fourth aspect, the partially upwards facing side of the first receiving plane forms a first acute angle to the vertical direction.

By having the receiving waveguide slots arranged at an acute angle to vertical, the antenna module is able to receive returned radar signals within a broader range in elevation than when the receiving waveguide slots are arranged in the same vertical plane as the radiating waveguide slots.

In a possible implementation form of the fourth aspect, the one or more first receiving antenna arrays comprise a total of 40 waveguide columns.

In a possible implementation form of the fourth aspect, the one or more first receiving antenna arrays are placed or stacked on top of the one or more radiating antenna arrays, which radiating antenna arrays have the cavity slots on the front side of the housing(s) arranged in the single radiating plane.

In a possible implementation form of the fourth aspect, the cavity slots on the front side of the housing(s) of one or more second receiving array(s) are arranged in a partially upwards facing side of a single, second receiving plane.

In a possible implementation form of the fourth aspect, the partially upwards facing side of the second receiving plane faces a second, upwards inclined direction, which second inclined direction is more upwards inclined than the first, slightly inclined direction.

In a possible implementation form of the fourth aspect, the partially upwards facing side of the second receiving plane forms a second acute angle to the vertical direction with the second angle being larger than the first angle.

In a possible implementation form of the fourth aspect, the one or more second receiving antenna arrays comprise a total of eight waveguide columns.

In a possible implementation form of the fourth aspect, the one or more second receiving antenna arrays are placed or stacked on top of the one or more first receiving antenna arrays.

In a possible implementation form of the fourth aspect, the receiving and transmitting antenna arrays are aligned so that the width of the stacked antenna arrays equals the length of a single antenna array.

In a possible implementation form of the fourth aspect, each radiating and receiving antenna array comprises eight waveguide columns.

In a possible implementation form of the fourth aspect, the first acute angle is in the range of 5-25°, such as in the range of 10-20°, such as about 15°.

In a possible implementation form of the fourth aspect, the second acute angle is in the range of 30-60°, such as in the range of 35-55°, such as in the range of 40-50°, such as about 45°.

In a possible implementation form of the fourth aspect, the radiating antenna arrays, which are arranged with the cavity slots on the front side in the radiating plane, are connected together by a number of parallel plate blinds secured to the front side of the radiating antenna array housings between the cavity slots and substantially perpendicular to the longitudinal direction of the waveguide columns.

In a possible implementation form of the fourth aspect, the first receiving antenna arrays, which are arranged with the cavity slots on the front side in the first receiving plane, are connected together by a number of parallel plate blinds secured to the front side of the first receiving antenna array housings between the cavity slots and substantially perpendicular to the longitudinal direction of the waveguide columns.

In a possible implementation form of the fourth aspect, the one or more second receiving antenna arrays comprises a single second receiving antenna array, which is arranged with the cavity slots on the front side in the second receiving plane, and which second antenna array has a number of parallel plate blinds secured to the front side of the housing between the cavity slots and substantially perpendicular to the longitudinal direction of the waveguide columns.

In a possible implementation form of the fourth aspect, the radiating and receiving planar slotted-waveguide antennae arrays are arranged within a protective housing being a radome, which radome has a front part with an inner surface and an outer surface, which front part covers the front side of the housing of each of the radiating and receiving antenna arrays with a constant spacing between the front side of the array housings and the inner surface of the radome front part. In a possible implementation form of the fourth aspect, the constant spacing is substantially equal to two times the distance between the centres of two neighbouring cavity slots of a waveguide column, or substantially equal to a guided signal wavelength of the waveguide columns of the antenna arrays.

In a possible implementation form of the fourth aspect, the thickness of the radome front part is substantially equal to half the distance between the centres of two neighbouring cavity slots of a waveguide column, or substantially equal to a quarter of a guided signal wavelength of the waveguide columns of the antenna arrays.

In a possible implementation form of the fourth aspect, the radome is made of a thermoplastic material, such as a blend of polymethyl methacrylate and polyvinyl chloride, PMMA/PVC.

It should be understood that the radar antenna module of the fourth aspect may comprise radiating and receiving narrow sided cavity slotted-waveguide antenna arrays selected from the cavity slotted-waveguide antenna arrays of the first, second and/or third aspects.

The foregoing and other objects are achieved by the features of the independent claims. Further implementation forms are apparent from the dependent claims, the description and the figures. These and other aspects of the invention will be apparent from the embodiments described below.

BRIEF DESCRIPTION OF THE DRAWINGS

In the following detailed portion of the present disclosure, the invention will be explained in more detail with reference to the example embodiments shown in the drawings, in which.

DETAILED DESCRIPTION

Figure 1A:
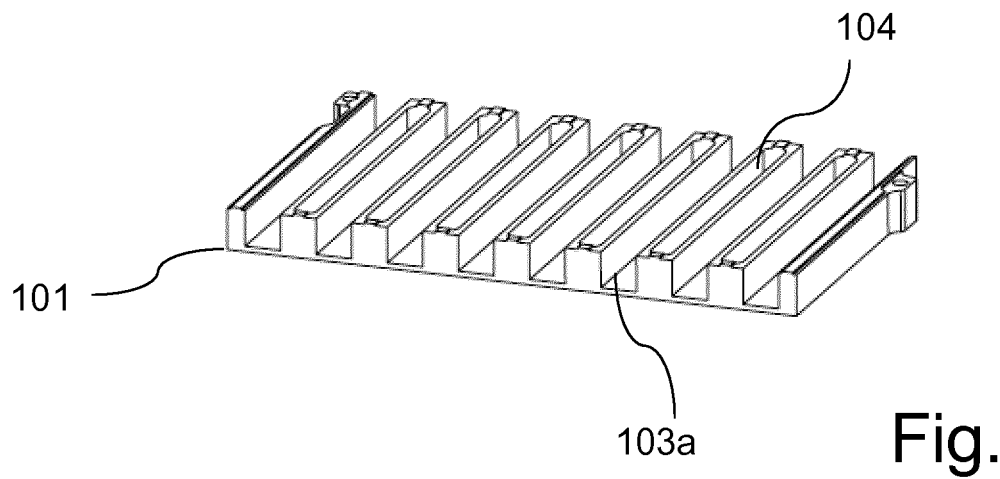
FIGS. 1a, b, c illustrates manufacturing of an array of slotted cavity columns for use in a planar cavity slotted-waveguide antenna array according to an example embodiment, with FIG. 1a illustrating manufacturing of a first one-piece metal element, and FIGS. 1b and 1c illustrating manufacturing of a second one-piece metal.

FIGS. 1a, b, c illustrates steps for manufacturing an array of slotted cavity columns for use in a planer cavity slotted-waveguide antenna array according to an example embodiment.

Figure 1B:
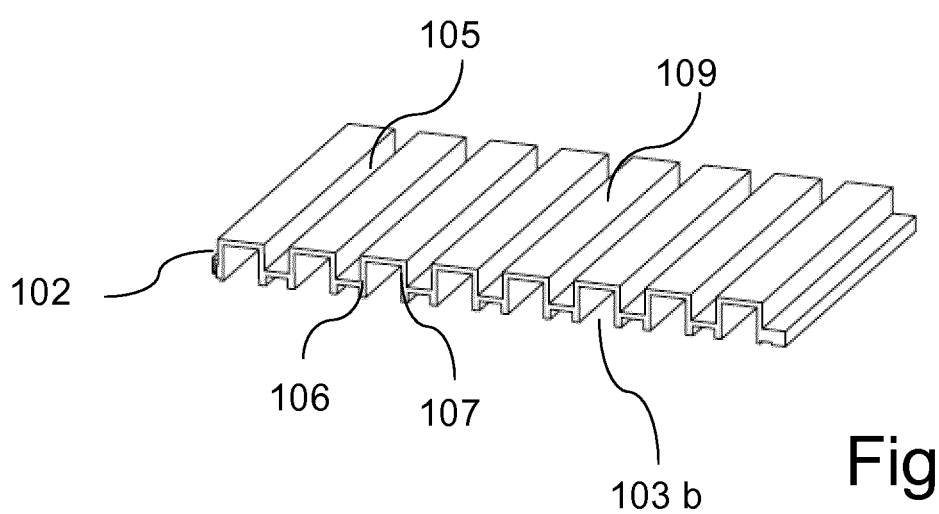
Figure 1C:
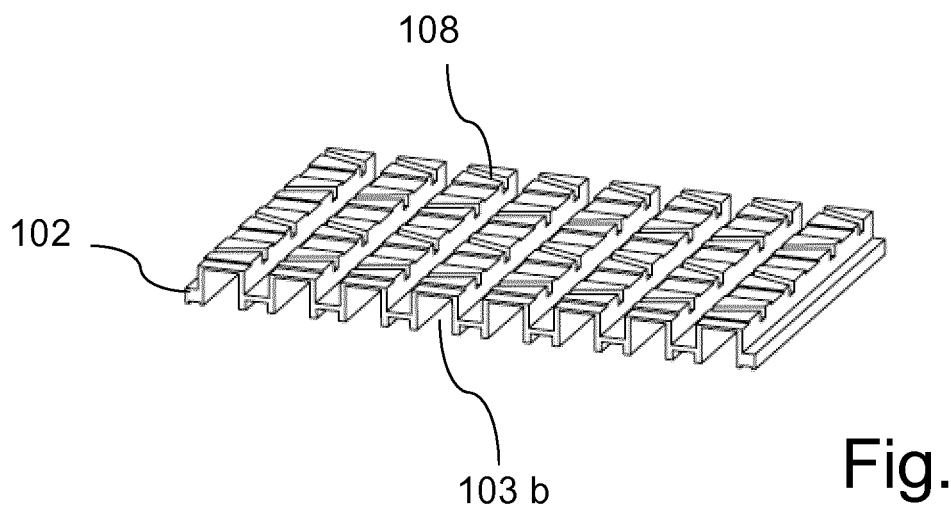

FIG. 1a illustrates manufacturing of a first one-piece metal element 101, which is a first single flat piece of metal, where a plurality of longitudinally extending parallel and equidistantly arranged open rear column portions 103a of equal dimensions are formed in the first flat piece of metal 101. In order to save weight of the final array, grooves 104 may be formed in the metal material left between the rear column portions 103a, FIGS. 1b and 1c illustrate manufacturing of a second one-piece metal element 102, which is a second single flat piece of metal, where a plurality of longitudinally extending parallel and equidistantly arranged open front column portions 103b of equal dimensions are formed in the second flat piece of metal 102. The front column portions 103b have a width and a length equal to the width and length of the rear column portions 103a, and the front column portions 103b are arranged with a spacing equal to the spacing of the rear column portions 103a. After formation of the front column portions 103b, a plurality of longitudinally extending parallel front recesses 105 are formed in the second metal element 102. These front recesses 105 extend into the second metal element 102 from the front surface of the element 102, and the front recesses 105 define first and second sidewalls 106, 107 of a front part of the front column portions 103b. After the formation of the front recesses 105, a plurality of slots 108 are formed in the front column portions 103b. Each slot 108 extends from the bottom of the corresponding front column portion 103b to a front surface 109 of the second metal element 102.

Figure 2:
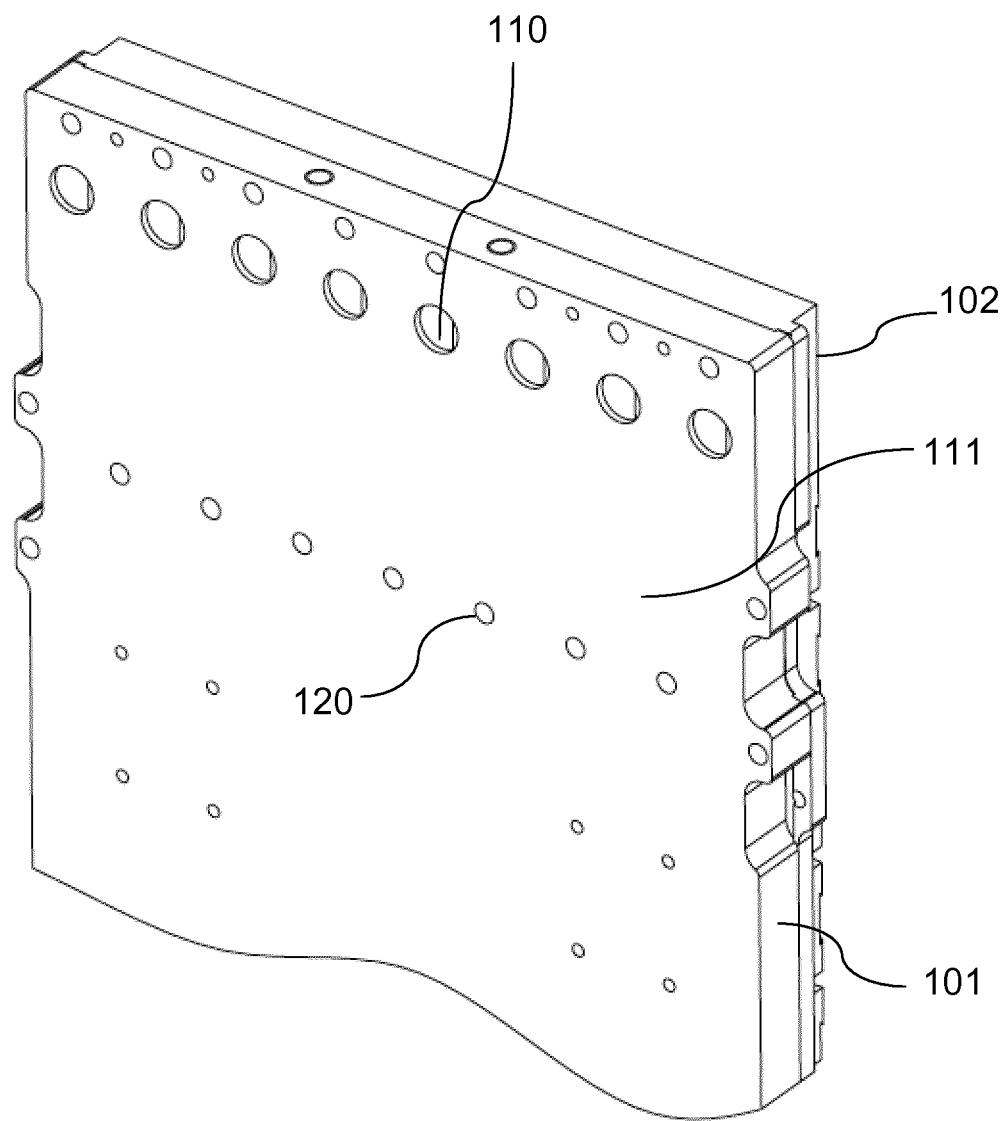
FIG. 2 is a bottom view illustrating further manufacturing steps of a cavity slotted-waveguide antenna array according to an example embodiment.

A signal probe hole 110 is formed at the bottom of the rear column portions 103a, where each probe hole extends from the bottom of the corresponding rear column portion 103a to a rear surface 111 of the first metal element 101. When the slots 108 and probe holes 110 have been formed, the first and the second metal elements 101 and 102 are connected together with the openings of the rear column portions 103a facing the openings of the front column portions 103b. The connection of the first and second metal elements 101 and 102 forms a housing, which comprises a number of parallel slotted-waveguide columns 103 having a rectangular cross-section, see FIG. 3, where the parallel slotted-waveguide columns 103 are formed by the rear and front column portions 103a, 103b. The arrangement of the probe holes 110 at the rear surface 111 of the first metal element 101 is illustrated in FIG. 2, which also shows the first and second metal elements 101 and 102 being connected together. The diameter of the probe hole 110 may equal the internal width of the columns 103 or rear column portions 103a. In FIG. 2 is also shown screw holes 120, which are provided at the rear surface 111 of the first metal element 101 in between the rear column portions 103a. The screw holes 120 may hold screws connecting the first and second metal elements 101 and 102.

The material used for the metal elements 101 and 102 may be anodized aluminium. Is it preferred that the formation of the rear column portions 103a and grooves 104 in the first metal element 101, the formation of the front column portions 103b, the front recesses 105, and the slots 108 in the second metal element 102 are performed by use of milling. The probe holes 110 may also be formed in the first metal element 101 by drilling.

Figure 3:
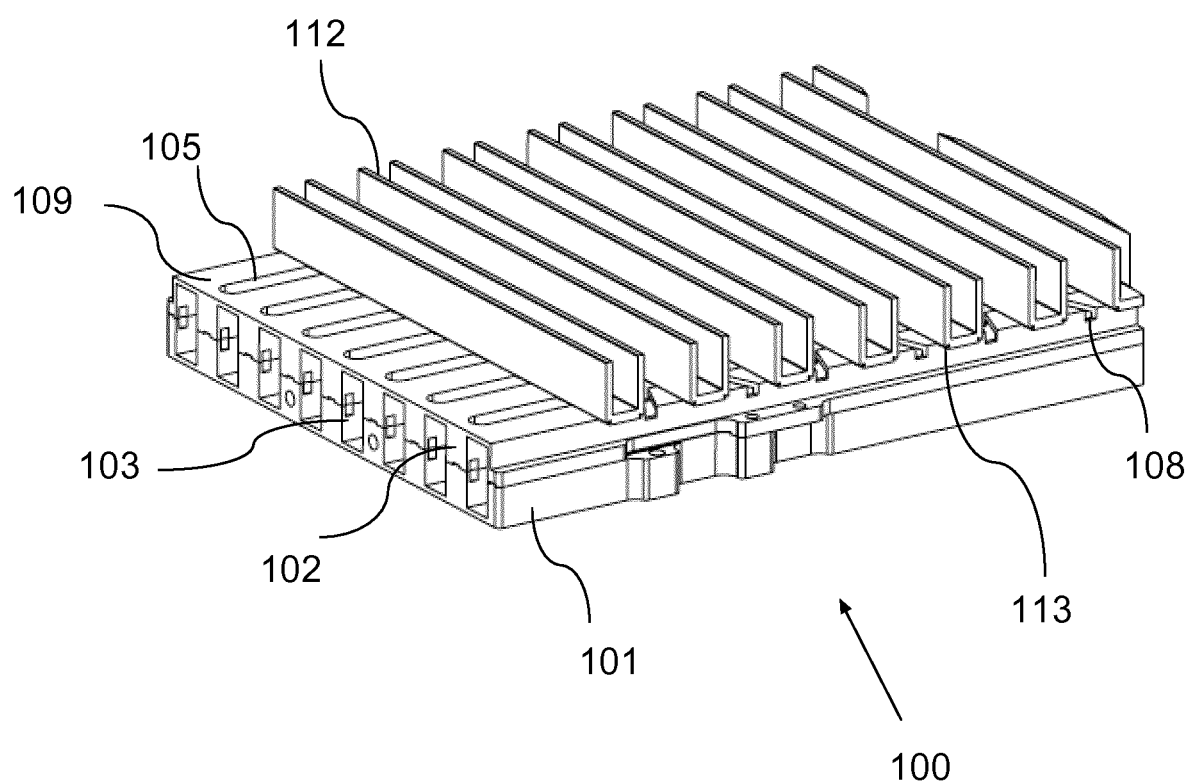
FIG. 3 shows a cavity slotted-waveguide antenna array holding plate blinds according to an example embodiment.

FIG. 3 shows part of a cavity slotted-waveguide antenna array 100, which has been manufactured and assembled as described above in connection with FIGS. 1a,b,c and FIG. 2. According to an example embodiment, the array 100 is further provided with a number of conductive parallel plate blinds 112, which are conductively secured to the front side or surface 109 of the housing holding the waveguide columns 103b, 103, where the front side or surface 109 holds the cavity slots 108. The plate blinds 112 are arranged substantially perpendicular to the longitudinal direction of the waveguide columns 103. The plate blinds 112 have two parallel outer surfaces being first and second parallel outer surfaces, and the blinds 112 are substantially U-shaped with two parallel side plates and a bottom plate. The plate blinds 112 are secured to the front side or surface 109 of the housing holding the waveguide columns 103b, 103 by a sliding dovetail joint 113. The tail of a dovetail joint is formed at a bottom part of a U-shaped plate blind 112 and the socket of the dovetail joint is formed in the front side or surface 109 of the housing holding the waveguide columns 103b, 103. The use of plate blinds 112 is optional.

Figure 4:
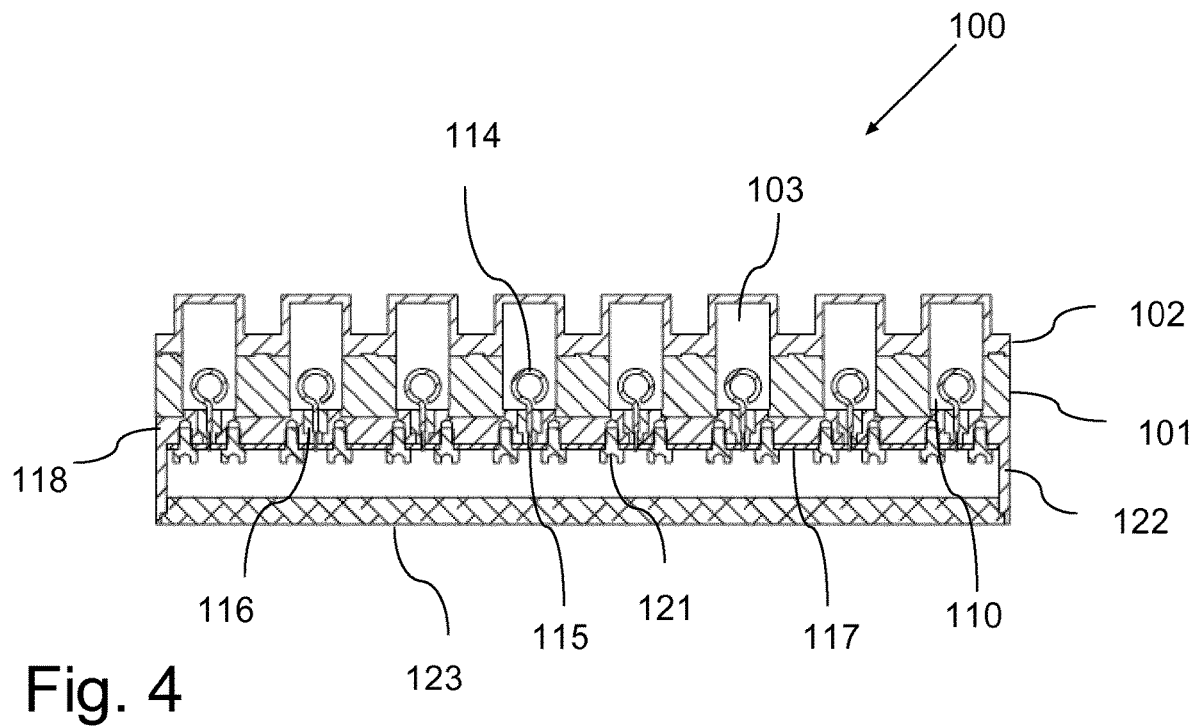
FIG. 4 is a cut through end view of a cavity slotted-waveguide antenna array with signal probes inserted according to an example embodiment.
Figure 5:
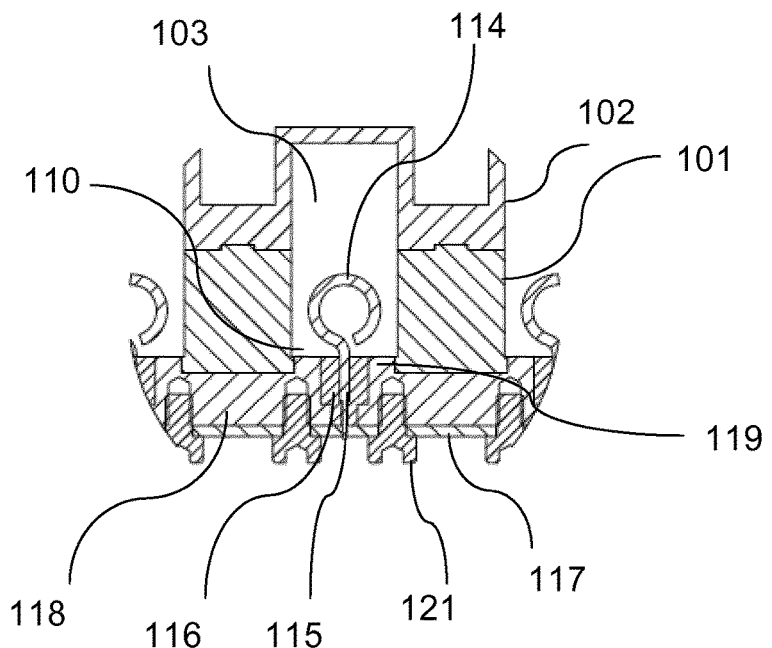
FIG. 5 is a cut through view showing details of the arrangement of a signal probe within a column of a cavity slotted-waveguide antenna array according to an example embodiment.

In order for the slotted-waveguide columns 103 to emit or receive an electromagnetic signal, a signal probe may be inserted in the probe hole 110. This is illustrated in FIGS. 4 and 5, where FIG. 4 is a cut through end view and FIG. 5 is an enlarged cut out view of a cavity slotted-waveguide antenna array 100 with signal probes 114 inserted in each waveguide column 103, according to an example embodiment.

The array 100 has eight waveguide columns 103 disposed in a predetermined adjacent position with respect to one another, where each column may be formed by a rear column portion 103a formed in a first one-piece metal element 101 and by a front column portion 103b formed in a second one-piece metal element 102. Each column 103 has a number of slots 108 formed in the front column portion 103b, see FIG. 1c, and each column 103 has an upper and a lower end. The waveguide columns 103 have a rectangular cross-section, and the waveguide columns 103 are defined by two wide inner surfaces being first and second wide inner surfaces, a narrow inner back surface, and narrow inner front surface. The narrow inner front surface and the front side 109 of the housing define a narrow front wall holding the cavity slots 108. The slots 108 are narrow walled slots or transverse narrow walled slots 108, which reach from the first inner wide surface to the second wide inner surface.

A signal probe 114 is operably disposed in each column 103 for emitting and/or receiving an electromagnetic signal. The electromagnetic signal may have a free-space wavelength of $\lambda_0$, and the signal propagates within the column 103 holding the signal probe 114 as electromagnetic waves with a corresponding guided signal wavelength $\lambda_g$. For the embodiment illustrated in FIGS. 4 and 5, the signal probes 114 are open ended loop probes with an open ended loop disposed at the narrow inner back surface opposite and facing the narrow inner front surface of the waveguide column 103 holding the loop probe 114.

The open ended loop of the loop probe 114 is arranged in a direction perpendicular to the longitudinal direction of the waveguide column 103, and the open ended loop probe 114 may be disposed proximal to the lower end of the column 103 holding the probe 114. According to an embodiment, each column 103 has an absorbing load at its upper end while the lower end of the waveguide column may be terminated with a short circuiting end geometry (blind end) or an absorbing load, to enable the column 103 to function in a travelling wave mode.

The signal probes 114 are formed of an electrically conductive material, such as copper or silver-plated copper, and are electrically non-conductively secured to the columns 103. The open ended loop of a loop probe 114 forms part of a loop circle, which may have a circumference in the range of ⅓ to ⅔, such as about ½ of the guided signal wavelength $\lambda_g$.

The housing holding the waveguide columns 103 has a rear side surface, and a a waveguide bottom wall is defined by the narrow inner back surface of a waveguide column 103 and the rear side surface of the housing, whereby an outer back surface of the waveguide bottom wall is defined by the rear side of the housing. The open ended loop probes 114 have a probe connection part 115 opposite the open ended loop, where the probe connection part 115 extends through probe holes 110 provided at the waveguide bottom wall. An enclosure part 118 is disposed between a printed circuit board, PCB, 117 and the outer back surface of the waveguide bottom wall, and the loop probe connection part 115 extends through a surrounding part 119, see FIG. 6, formed by the enclosure part 118 to reach the printed circuit board 117. An end part of the connection part 115 of each of the loop probes 114, which may reach through the PCB 117 by a so-called via, is electrically connected to a corresponding electrical conductive signal trace provided at the front surface of the printed circuit board 117. The surrounding parts 119 of the enclosure part 118 may be formed to fit or fill out the probe holes 110, and the probe holes 110 may have a diameter equal to the internal width of the column 103. An electrically non-conductive material 116 surrounds the probe connection part 115 extending through the enclosure part 119, 118. The electrical non-conductive material may comprise or is made of Polyether Ether Ketone, PEEK, plastic. The enclosure part 118 holds sidewalls 122, and a lid 123 is secured to the sidewalls to close off the enclosure part 118.

The enclosure part 118 is made of an electrical conductive material, such as aluminium. Before securing the enclosure part 118 to the rear side of the array housing holding the waveguide columns, the probes 114 and the PCB 117 may be connected to the enclosure part 118. First, each loop probe 114 is connected to the enclosure part 118 by having the connection part 115 surrounded by the non-conductive material 116 and arranged within the surrounding part 119 of the enclosure part 118. The printed circuit board, PCB, 117 can then be secured to the enclosure part 118 by screws 121 with the end part of the probe connection part 115 reaching through the PCB 117 by the so-called via. The end part of the probe connection part 115 can now be soldered or electrical connected to a corresponding electrical conductive signal trace provided at the front surface of the printed circuit board 117. The PCB 117 has a bottom surface facing the enclosure part 118, where the PCB bottom surface holds electrical conductive ground traces or parts to provide an electrical ground connection to the enclosure part 118. In an embodiment, the enclosure part 118 is silver plated for maintaining an electrical connection between the enclosure part 118 and the PCB bottom ground traces. Each PCB signal trace corresponding to a loop probe 114 may have a first trace end soldered to the end part 115 of the loop probe 114, and each of these PCB signal traces is a copper trace, which preferably is formed to obtain a characteristic impedance of 50 Ohm. The PCB signal traces having one end electrically corresponding to a loop probe 114, may in the other end be electrically connected to radio frequency transmit circuitry, when the array is a transmitting array, or connected to receive circuitry, when the array is a receiving array, where the transmit or receive circuitry is arranged at the front surface of the PCB 117. The radio frequency transmit circuitry may comprise a radio frequency amplifier, and the receive circuitry may comprise a pseudomorphic high electron mobility transistor, PHEMT.

Figure 6:
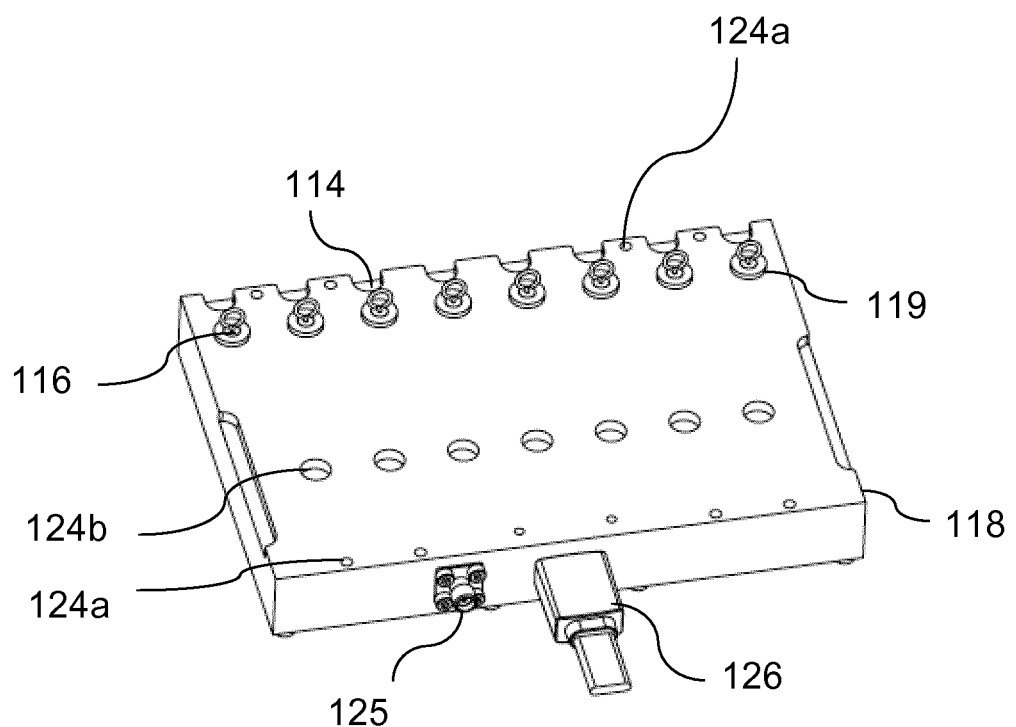
FIG. 6 shows an enclosure with signal probes to be connected to a cavity slotted-waveguide antenna array according to an example embodiment.

FIG. 6 is a bottom view of the enclosure part 118 before being connected to the antenna array 100, and shows the electrical non-conductive material 116 surrounding the connection part 115 of the signal probes 114, and the projecting parts 119 of the enclosure part 118, which parts 119 surrounds the non-conductive material 116. The enclosure part 118 holds a number of screw holes 124a for securing the enclosure part 118 to corresponding holes at the rear surface or bottom 111 of the first metal element 101. A number of holes 124b are also provided, which match the screw holes 120 at the rear surface or bottom 111 of the first metal element 101, and which holes 124b may hold screw heads of screws connecting the first and second metal elements 101 and 102, see also FIG. 2. A coaxial radio frequency, RF, connector 125, such as a subminiature version A, SMA, connector is arranged at the enclosure part 118 for receiving/transmitting a master radio frequency, RF, signal. A connector 126 for receiving electrical power for feeding the circuitry on the PCB 117 is also arranged at the enclosure part 118.

Figure 7:
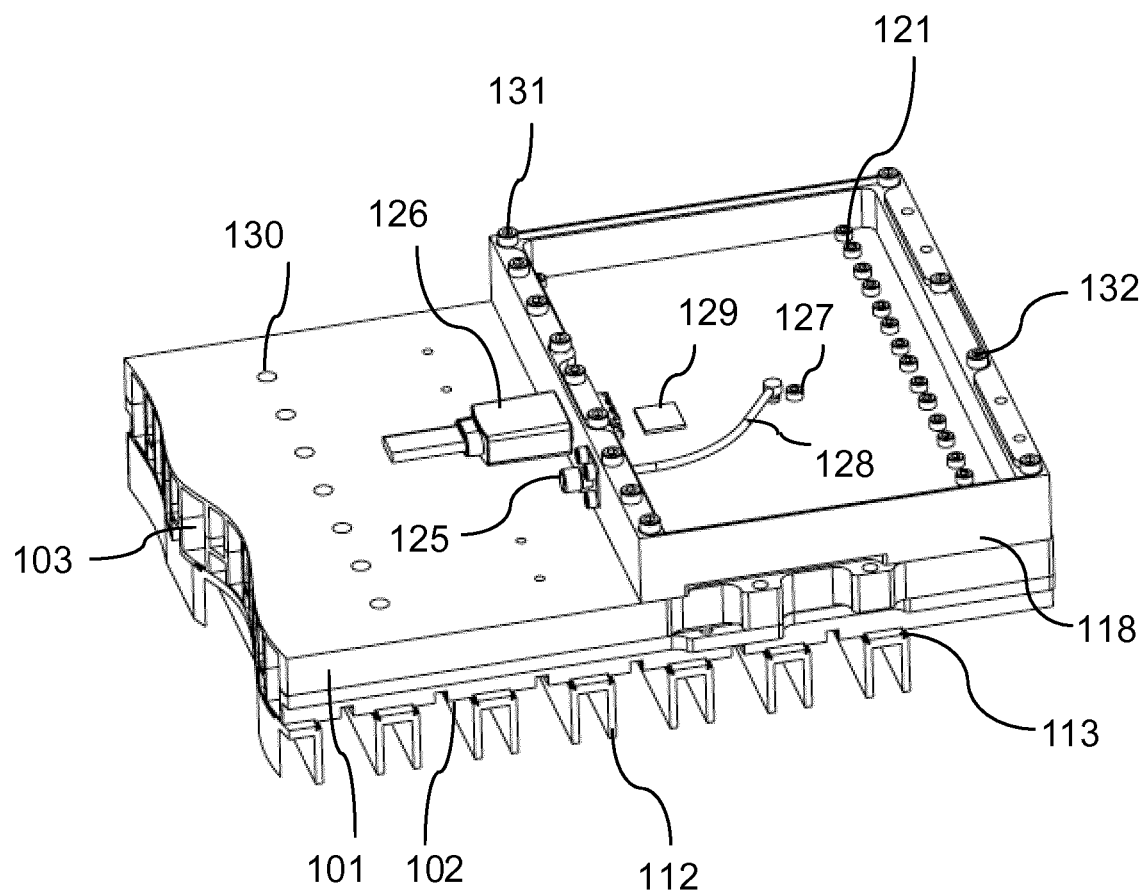
FIG. 7 shows the arrangement of the enclosure of FIG. 5 on the array of FIG. 3 according to an example embodiment.

FIG. 7 illustrates the arrangement of the PCB 117 and the enclosure part 118 of FIG. 6 on the array 100 of FIG. 3 according to an example embodiment. In FIG. 7, the lid 123 has been removed for illustration of the arrangement. When the loop probes 114 and the PCB 117 have been connected to the enclosure part 118, the enclosure part 118 is arranged with the probes 114 within the probe holes 110, and the enclosure part 118 is then secured to the rear surface or bottom 111 of the first metal element 101 by screws 131 and 132 using the screw holes 124a. The PCB 117 has been secured to the enclosure part 118, with a pair of screws 121 on each side of the signal probe 114 for providing a good connection between the PCB 117 and the enclosure part 118. Further screws 127 may be used for securing the PCB 117 to the enclosure part 118. The screws 131 and 132 are also securing the lid 123 to the walls 122 of the enclosure part 118, and the screws 131 and 132 extend through the walls 122 to secure the enclosure part 118 to the rear surface or bottom 111 of the first plate 101. FIG. 7 also shows the arrangement of electronic circuitry 129, such as a radio frequency amplifier, at the PCB 117, and a coaxial line 128 for feeding the master RF signal from the connector 125 to the PCB 117. Also seen in FIG. 7 are screw holes 130, which may be used when connecting the first plate 101 and the second plate 102 together, and the plate blinds 112 being secured to the second plate 102 by dovetail joints 113.

Figure 8:
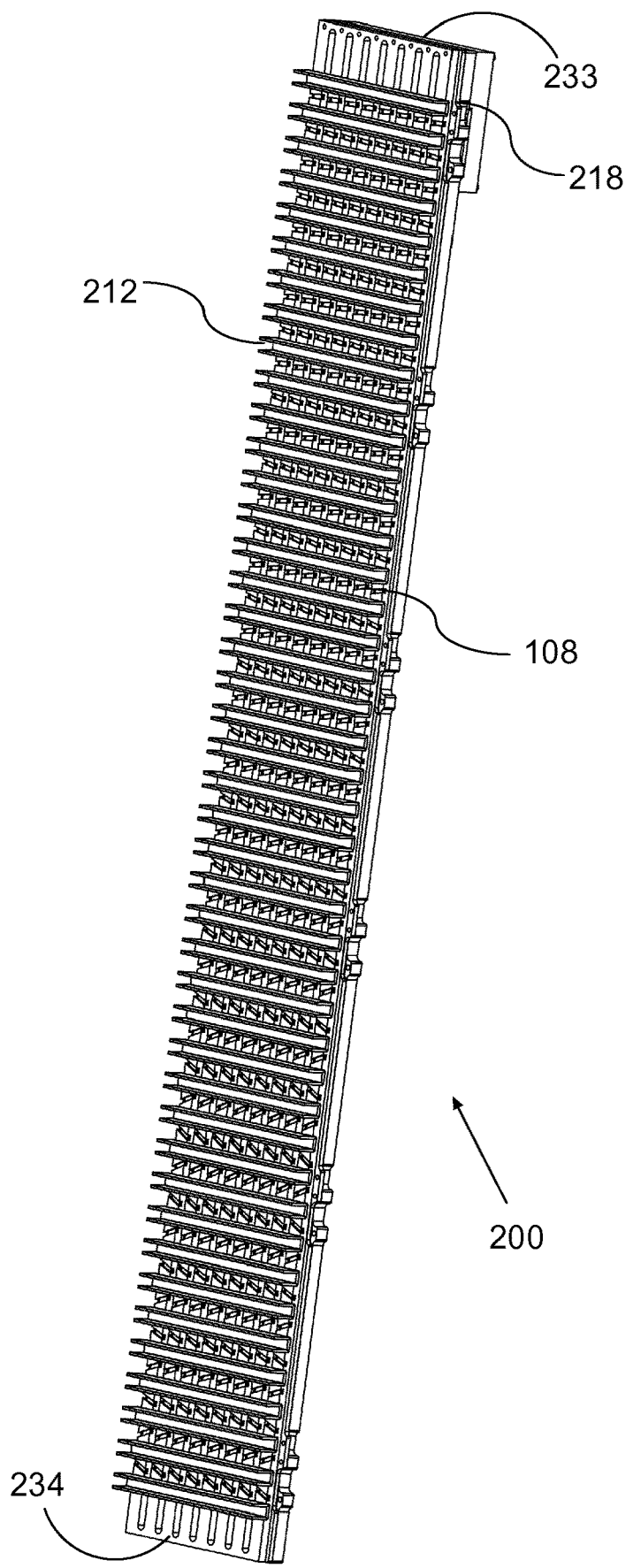
FIG. 8 is a full perspective view of a cavity slotted-waveguide antenna array according to an example embodiment.

FIG. 8 is a full perspective view of a cavity slotted-waveguide antenna array 200 according to an example embodiment. The array 200 may be manufactured and assembled in accordance with the above description of the array 100 given in connection with FIGS. 1 to 7. The array 200 has a first, upper end 233 and a second, lower end 234, with an enclosure part 218 secured to the bottom at the first end 218. The enclosure part 218 may be equal to the enclosure part 118 of FIG. 6 and hold coaxial feeds 125 and 128, electronic circuitry 129 on a printed circuit board, PCB, 117, and signal probes 114 inserted through probe holes 110 into the bottom of waveguide columns 103 of the array 100, 200. An absorbing load may be provided at the second end 234 of each column 103 in order to enable the columns 103 to guide the electromagnetic waves in the travelling eave mode, while the first end 233 of each column 103 may be terminated with a short circuiting end geometry (blind end). The array 200 holds eight waveguide columns 103, where each column 103 holds 42 narrow walled waveguide slots 108, and 43 U-shaped plate blinds 212, which may be equal to the plate blinds 112 described in connection with FIG. 3.

A first plate blind 212 is arranged close to the first end 233 before the first slot 108 of each column 103, then a plate blind 212 is arranged after each following slot 108 of the columns 103, with the last plate blind 212 arranged after the last slot 108. The use of plate blinds 212 is optional.

In the following is given a further discussion of the dimensions and operation of the cavity slotted-waveguide antennas 100 and 200 of FIGS. 3 and 8.

The antenna arrays 100, 200 of FIGS. 3 and 8 holds several waveguide columns 103 disposed in a predetermined adjacent position with respect to one another. For the arrays 100, 200 shown in FIGS. 3 and 8, the number of waveguide columns 103 is eight. The waveguide columns 103 are vertically disposed in a housing, have a rectangular cross-section, and are defined by two wide inner surfaces being first and second wide inner surfaces, a narrow inner back surface, and narrow inner front surface. The narrow inner front surface and the front side 109 of the housing define a narrow front wall holding the cavity slots 108. Each column 103 has a first, upper end and an opposite second, lower end, and each column 103 holds the same number of narrow walled slots 108 disposed in the narrow front wall. It is preferred that each column 103 holds an equal number of slots 108, and for the arrays 100, 200 of FIGS. 3 and 8, the number of column slots is 42.

Each waveguide column 103 in the array 100 or 200 forms an antenna, which is dimensioned for radiating and/or receiving electromagnetic waves at a free-space wavelength, $\lambda_0$. Wave front propagating in waveguides is slower than in air, as the wave front takes a crisscross path inside the waveguide. Thus, the wavelength, $\lambda_g$, inside the waveguide column 103 is slightly larger than the free-space wavelength, $\lambda_0$. In order for the waveguide column 103 to radiate waves in the correct phase, the dimensions of the waveguide 103 must be selected according to the guided wavelength, $\lambda_g$, while the dimensions of the slots 108 must be selected to radiate waves at the free-space wavelength, $\lambda_0$. At the fundamental TE10 mode, the guided wavelength, $\lambda_g$, may be found from the equation:

$$\lambda_g = \lambda_0 / (\sqrt{(1-(\lambda_0/2a)^2)}) \qquad (1).$$

In equation (1), "a" is the length of the wide inner surfaces of the rectangular waveguides 103, where the cut-off wavelength, $\lambda_c$, of the waveguide 103 is set equal to 2a.

In an embodiment, each column 103 has an absorbing load provided at the second, lower end 234 in order to enable the columns 103 to guide the electromagnetic waves in the travelling wave mode, while the upper, first end 233 of each column 103 may be terminated with a short circuiting end geometry (blind end). For a waveguide column 103 designed to host a travelling wave, the slots 108 may be spaced at half the guided wavelength, $\lambda_g$, and the column 103 should be terminated at the second end 234 with an absorbing load spaced at three quarters of the guided wavelength, $\lambda_g$, from the centre of the last slot 108. The signal probe 114 may be inserted into the column 103 with a spacing of three quarters of guided wavelength, $\lambda_g$, from the centre of the first slot 108, while the column 103 should be terminated at the first end 233 with a short circuiting end geometry spaced at one quarter of the guided wavelength, $\lambda_g$, from the coupling probe 114.

The slots 108, which are formed in the narrow front wall, need to be relatively narrow with a width, which is small compared to the length of the slot 108. The length of the slots should be approximately half the free-space wavelength, $\lambda_0$.

In order to achieve a resonant length of half the free-space wavelength, $\lambda_0$, for the narrow walled slots 108, the slots 108 must penetrate into the sidewalls of the columns 103, which sidewalls form the two wide inner waveguide surfaces. This type of slots 108 are known as edge-slots. The slots 108 may be arranged in pairs, where each cavity slot pair includes an upper slot and a lower slot, and where each slot 108 has an associated angular displacement to the longitudinal direction of the waveguide columns 103. The angular displacements of the upper and lower slots 108 are substantially equivalent to one another, but in an opposite orientation.

By tilting the direction of the slots 108, a fraction of the current flow along the waveguide column 103 is interrupted, causing the slots 108 to radiate. By having opposite inclinations of adjacent slots 108, the vertical components from these slots 108 may be partly cancelled out in space.

Ideally, the vertical polarized components from the narrow walled slots 108 should be fully cancelled out, leaving only the horizontal polarized components. The remaining vertical polarized components, also named the cross-polarization radiation pattern, can be reduced by use of conductive plate blinds 112, 212 arranged between each pair of slots 108. Thus, the antenna array 100, 200 may be provided with several conductive parallel plate blinds 112, 212 being conductively secured to the front side or surface 109 of the housing holding the waveguide columns 103. For the array 200 of FIG. 8, the number of plate blinds is 43. Each plate blind 112, 212 comprises two parallel outer surfaces, a first and a second outer surface. The plate blinds 112, 212 are secured to front the side 109 of the housing holding the waveguide columns 103 with the parallel outer surfaces of the plate blinds 112, 212 being substantially perpendicular to the longitudinal direction of the waveguide columns 103 and substantial perpendicular to the front side of the housing holding the waveguide columns 103. The plate blinds 112, 212 are arranged so that two adjacent plate blinds 112, 212 are disposed with a single waveguide slot 108 in between. Thus, a plate blind 112, 212 is provided between the two slots 108 of each cavity slot pair. Also a plate blind 112, 212 is provided near the first column end 233 before the first column slot 108, and a plate blind 112, 212 is provided near the second column end 234 after the last column slot 108.

For the waveguide columns 103 of the antenna arrays 100, 200 the centres of the slots 108 of each column 103 are separated by half of the guided wavelength, $\lambda_g$. The plate blinds 112, 212 are arranged with a spacing equal to the spacing of the slots 108, and the spacing between the centres of adjacent plate blinds is therefore substantially equal to half the guided signal wavelength, $\lambda_g$.

An effective reduction of the cross-polarization radiation may be obtained when the spacing between the plate blinds 112, 212 is less than half the free-space signal wave length $\lambda_0$, which again is smaller than the guided signal wave length, $\lambda_g$. Thus, in order to reduce the distance between the plate blinds 112, 212 below half the free space signal wave length $\lambda_0$, the width of the plate blinds 112, 212 is increased by keeping a distance between the first and second outer surfaces, where the distance between the first and second outer surfaces of the plate blinds 112 may be in the range of one third to one half of the free-space signal wave length, $\lambda_0$.

The height of the plate blinds 112, 212 also has an influence on the cross-polarization suppression, and for the arrays 100, 200 of FIGS. 3 and 8, the height of the parallel outer surfaces of the plate blinds above the outer front surface of the columns 103 is selected to be in the range of 20-60% of the free-space signal wave length, and it is preferred that the height is substantial equal to ½ of the free-space signal wave length.

In order to save material and weight and also for ease of manufacturing, the plate blinds 112, 212 are designed to be substantially U-shaped with two parallel side plates and a bottom plate. For ease of manufacturing and for stabilizing the planar array 100, 200 the U-shaped plate blinds 112, 212 may be secured to the front side or surface 109 of the housing holding the waveguide columns 103 by a sliding dovetail joint. Here, the tail of a dovetail joint may be formed at a bottom part of a U-shaped plate blind 112 and the socket of the dovetail joint is formed in the front side or surface 109 of the housing holding the waveguide columns 103 in between the slots 108.

The distance between the centres of adjacent positioned waveguides columns 103 should be set to be equal to or above half the free-space wavelength $\lambda_0$. For the array 100, the distance between the centres of adjacent positioned waveguides columns 103 is set about ⅔ or in the range of 0.5 to 0.75 of the free-space wavelength $\lambda_0$.

The following describes construction details for an example embodiment of an antenna array 100 designed to operate in a wideband frequency range of 9550 to 9750 MHz, corresponding to a free-space wavelength $\lambda_0$ in the range of 30.77-31.4 mm, or to operate with a free-space wavelength $\lambda_0$ about 30 mm.

In order to operate in the above mentioned frequency range, the waveguide columns 103 are dimensioned with a height "a" of the wide inner surfaces to be about ⅔ $\lambda_0$, such as 20 mm and a width "b" of the narrow inner back and front surfaces to be about ⅓ $\lambda_0$, such as 10 mm. The waveguide columns 103 are produced by use of milling from the first and second metal elements 101, 102 being of anodized aluminium having a plate thickness of 12 mm, and the thickness of the walls 106, 107 defining the upper parts of the wide inner surfaces of the waveguide columns 103b, 103 is about 2 mm, and the thickness of the narrow front wall is also 2 mm.

From equation (1) the guided wavelength, $\lambda_g$, can be calculated by inserting the values of $\lambda_0$ and "a", where $\lambda_0$ set to 30.77 mm gives a value of $\lambda_g$, which is equal to 48 mm, and where $\lambda_0$ set to 31.4 mm gives a value of $\lambda_g$, which is equal to 50.64 mm.

From the above values of $\lambda_0$ and $\lambda_g$, the average values are found as $\lambda_{0,av}$ equal to 31 mm and $\lambda_{g,av}$ equal to 49.3 mm, which gives a value for half the free-space wavelength, ½ $\lambda_0$, to be about 15.5 mm, and a value for half the guided wavelength, ½ $\lambda_g$, to be about 24.66 mm.

Thus, the distance between the centres of neighbouring slots 108 of a waveguide column 103 is set to about 24.66 mm or 25 mm, and the total length of the edge-slots 108 including the penetrations into the sidewalls 106, 107 is set to about 15.5 mm or 15 mm. The width of the edge-slots 108 is set to 3.6 mmm, and the slots 108 are arranged with an angular displacement of about 35 degrees to the longitudinal direction to the waveguide column 103, where neighbouring slots 108 are arranged with equal, but opposite angular displacement.

The waveguide columns 103 holding the 42 slots 108 has a total internal length of 1192 mm, and a total outer length of 1208 mm.

For the travelling waveguide columns 103, the absorbing load at the second end 234 is arranged with a spacing of three quarters of the guided wavelength, $\lambda_g$, which is equal to 37 mm, to the centre of the last slot 108. The signal probe 114 is inserted into the column 103 with a spacing of three quarters of a guided wavelength, $\lambda_g$, which is about 42 mm, to the centre of the first slot 108, while the short circuiting end geometry at the first end 233 is arranged with a spacing of one quarter of the guided wavelength, $\lambda_g$, which is at least about 12-13 mm, such as 12.4 mm, to the centre of the coupling probe 114.

The distance between the centres of adjacent positioned waveguides columns 103 is set to be about 20 mm, which is about two third of the free-space wavelength $\lambda_0$. This distance leaves a free space of about 6 mm between the sidewalls of neighbouring columns 103.

The spacing between the centres of adjacent plate blinds 112 is set equal to the distance between the centres of neighbouring slots 108, which is 24.66 mm or 25 mm, to be about half the guided signal wavelength, $\lambda_g$, and the distance between the first and second outer surfaces of the plate blinds 112 may be set to 9.86-12 mm, which is in between one third and half of the free-space signal wave length, $\lambda_0$. The spacing left between opposite outer surfaces of neighbouring plate blinds 112 is then about 12.66-14.8 mm, which is below half the free-space signal wave length of 15.5 mm, in order to effectively reduce the cross-polarization radiation. The height of the parallel outer surfaces of the plate blinds 112 above the outer front surface of the columns 103 may be set to be 15.5 mm, which is substantial equal to ½ of the free-space signal wave length, to thereby further reduce the cross-polarization radiation. The U-shaped plate blinds 112 are made in aluminum with a sidewall thickness of 1.8 mm. The bottom part of the U-shaped plate blinds 112 has a wall thickness of 1.7 mm, and holds the tail of the dovetail joint to fit with the socket of the dovetail joint formed in the waveguide columns 103 in between the slots 108.

The herein described cavity slotted-waveguide antenna array 100, 200 can be used to form a radar antenna module having a number of antenna arrays configured as radiating or transmitting antennas, and a number of antenna arrays configured as receiving antennas. Here, each of the radiating and receiving antenna arrays will be a planar slotted-waveguide antenna array comprising several waveguide columns disposed in a parallel and adjacent position with respect to one another in an array housing, where the array housing has a front side and a rear side with the waveguide columns being provided with the cavity slots on the front side of the housing. An example embodiment of such an antenna module 300 is shown in FIG. 9.

Figure 9:
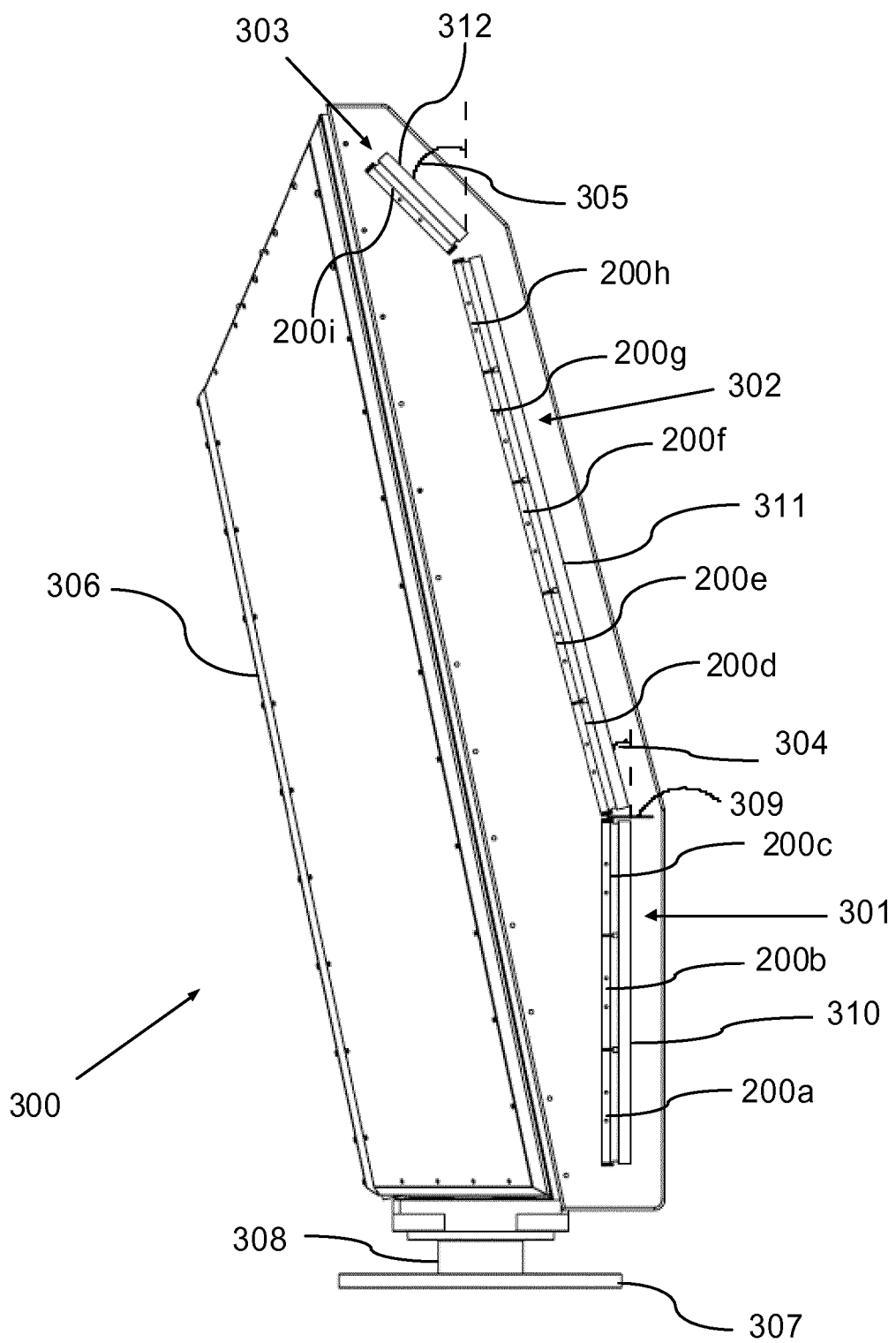
FIG. 9 shows a radar antenna module using a number of cavity slotted-waveguide antenna arrays according to an example embodiment.

The module 300 of FIG. 9 has a radiating antenna section 301 and two receiving antenna sections 302 and 303. The radiating section 301 may hold three planar radiating narrow sided cavity slotted-waveguide antenna arrays 200a, 200b, 200c, which may be of the type 100, 200 described herein, and which are configured for radiating horizontal polarized electromagnetic waves. The first receiving section 302 may hold five narrow sided cavity slotted-waveguide antenna arrays 200d, 200e, 200f, 200g, 200h, which may be of the type 100, 200 described herein, and which are configured for receiving horizontal polarized electromagnetic waves. The second receiving section 303 may hold a single narrow sided cavity slotted-waveguide antenna array 200i, which may also be of the type 100, 200 described herein, and which is configured for receiving horizontal polarized electromagnetic waves.

Each of the arrays 200a, 200b, 200c, 200d, 200e, 200f, 200g, 200h, and 200i holds eight waveguide columns, whereby the radiating section 301 may hold a total of 24 waveguide columns, the first receiving section 302 may hold a total of 40 waveguide columns, and the second receiving section 303 may hold a total of eight waveguide columns.

The waveguide columns of each of the arrays of the radiating and receiving sections 301, 302, 303, are of equal length and arranged in a parallel and adjacent position with respect to one another.

In an embodiment of the module 300 the antenna arrays 200a, 200b, 200c, 200d, 200e, 200f, 200g, 200h, 200i of the radiating and receiving sections 301, 302, 303 are arranged with the longitudinal direction of the waveguide columns extending in a single horizontal direction.

The antenna arrays 200a, 200b, 200c, 200d, 200e, 200f, 200g, 200h, 200i of the radiating and receiving sections 301, 302, 303 are arranged within a protective housing being a radome 306, which radome is rotational connected to a foot or platform 307 for rotation about a vertical axis of rotation 308. The rear side of the housing of each of the radiating antenna arrays 200a, 200b, 200c faces the axis of rotation 308, while the cavity slots of the front side of the housing of the radiating antenna arrays 200a, 200b, 200c face away from the axis of rotation 308.

The arrays 200a, 200b, 200c, 200d, 200e, 200f, 200g, 200h, 200i of both the radiating section 301 and the receiving sections 302 and 303 are arranged so that the front side and the cavity slots 108 of the housings of the radiating and receiving antenna arrays 200a, 200b, 200c, 200d, 200e, 200f, 200g, 200h, 200i face one or more directions with each of these directions having a component in the same horizontal direction.

The cavity slots 108 on the front side of the housings of the arrays 200a, 200b, 200c of the radiating section 301 are arranged in a single radiating plane. The radiating plane face a substantially horizontal direction and extends substantially in the vertical direction.

The cavity slots 108 on the front side of the housings of the arrays 200d, 200e, 200f, 200g, 200h of the first receiving section 302 are arranged in a partially upwards facing side of a single, first receiving plane. The partially upwards facing side of the first receiving plane faces a first, slightly upwards inclined direction, whereby the partially upwards facing side of the first receiving plane forms a first acute angle 304 to the vertical direction.

The arrays 200d, 200e, 200f, 200g, 200h of the first receiving section 302 are placed or stacked on top of the arrays 200a, 200b, 200c of the radiating section 301, with a electromagnetic shield plate 309 arranged between the most upper radiating array 200c and the lower most receiving array 200d.

The cavity slots 108 on the front side of the housings of the array 200i of the second receiving section 302 are arranged in a partially upwards facing side of a single, second receiving plane. The partially upwards facing side of the second receiving plane faces a second, upwards inclined direction, which second inclined direction is more upwards inclined than the first, slightly inclined direction, whereby the partially upwards facing side of the second receiving plane forms a second acute angle 305 to the vertical direction with the second angle 305 being larger than the first angle 304.

The array 200i of the second receiving section 303 are placed or stacked on top of the upper most array 200h of the first receiving section 302. The arrays 200a, 200b, 200c, 200d, 200e, 200f, 200g, 200h, 200i of the radiating section 301 and the receiving sections 302 and 303 are aligned so that the width of the stacked antenna arrays equals the length of a single antenna array.

The module 300 of in FIG. 9 holds a radiating section 301 with radiating antenna arrays 200a, 200b, 200c arranged on top of each other in the vertical direction, and with the longitudinal direction waveguide columns 103 (see the antenna array 100 of FIG. 3) running in the horizontal direction. The module 300 of FIG. 9 also holds the first receiving section 302 with a first set of receiving antenna arrays 200d, 200e, 200f, 200g, 200h, which are arranged on top of each other in a single, first receiving plane, which first receiving plane has the first acute angle 304 to the vertical direction. The module 300 of FIG. 9 may further holds the second receiving section 303 with a receiving antenna array 200i defining a second receiving plane, which second receiving plane has the second acute angle 305 to the vertical direction.

However, although the receiving arrays 200d, 200e, 200f, 200g, 200h and 200i are arranged in planes being at an angle to the vertical plane of the radiating arrays 200d, 200e, 200f, the waveguide columns 103 of the receiving arrays 200d, 200e, 200f, 200g, 200h, 200i may also have the longitudinal direction of the waveguide columns 103 extending in a single horizontal direction, which horizontal direction is the same as the horizontal direction of the waveguides column 103 of the radiating arrays 200a, 200b, 200c.

It is noted that FIG. 9 only shows the end parts of antenna arrays 200. The arrangement of the waveguide columns 103 and the slots 108 are illustrated in FIGS. 1c, 3 and 8. From FIGS. 1c, 3, 8 and 9, and the accompanying description, the position of the slots 108 and the waveguide columns 103 within the arrays 200 should be understood.

The first acute angle 304 should be in the range of 5-25°, such as in the range of 10-20°, and for the module 300 of FIG. 9, the first angle is 15°. The second acute angle 305 should be in the range of 30-60°, such as in the range of 35-55°, such as in the range of 40-50°, and for the module 300 of FIG. 9, the second angle is 45°.

The arrays 200a, 200b, 200c of the radiating section 301 are connected together by a number of parallel plate blinds 310 secured to the front side of the array housings of the radiating antenna arrays 200a, 200b, 200c between the cavity slots and substantially perpendicular to the longitudinal direction of the waveguide columns. The arrays 200d, 200e, 200f, 200g, 200h of the first receiving section 302 are also connected together by a number of parallel plate blinds 311 secured to the front side of the array housings of the receiving antenna arrays 200d, 200e, 200f, 200g, 200h between the cavity slots and substantially perpendicular to the longitudinal direction of the waveguide columns. The single array 200i of the second receiving section 303 has also a number of parallel plate blinds secured to the front side of the array housing of the array 200i between the cavity slots and substantially perpendicular to the longitudinal direction of the waveguide columns.

The protective housing or radome 306 has a front part 312 with an inner surface and an outer surface, where the front part 312 is arranged to cover the front side of the array housing of each of the radiating and receiving antenna arrays 200a, 200b, 200c, 200d, 200e, 200f, 200g, 200h, 200i with a constant spacing between the front side of the array housings and the inner surface of the radome front part 312.

In order not to absorb or disturb the radiated and received electromagnetic waves, the radome is made of a thermoplastic material, such as a blend of polymethyl methacrylate and polyvinyl chloride, PMMA/PVC, and the constant spacing between the front side of the array housings and the inner surface of the radome front part 312 is set substantially equal to two times the distance between the centres of two neighbouring cavity slots of a waveguide column, or substantially equal to a guided signal wavelength $\lambda_g$ of the waveguide columns of the antenna arrays. The thickness of the radome front part 312 is set substantially equal to half the distance between the centres of two neighbouring cavity slots of a waveguide column, or substantially equal to a quarter of the guided signal wavelength $\lambda_g$.

The present disclosure has been described in conjunction with various embodiments herein. However, other variations to the disclosed embodiments can be understood and effected by those skilled in the art in practicing the claimed present disclosure, from a study of the drawings, the disclosure, and the appended claims. In the claims, the word "comprising" does not exclude other elements or steps, and the indefinite article "a" or "an" does not exclude a plurality.

Any method described herein and in the claims may be supplemented by any features of the apparatuses and systems described herein and in the claims in terms of method features.

The invention claimed is:

1. A cavity slotted-waveguide antenna array comprising:
an array of waveguide columns disposed in parallel in a predetermined adjacent position with respect to one another in a housing having a front side and a rear side with several of the waveguide columns being provided with a plurality of cavity slots on the front side of said housing, said waveguide columns having upper and lower ends, and said waveguide columns being waveguides with a rectangular cross section, with each of the waveguide columns being defined by two opposing wide inner surfaces, a narrow inner back surface, and a narrow inner front surface, with the plurality of cavity slots extending from the front side of the housing to said narrow inner front surface, and wherein each of the waveguide columns has a probe hole formed in a waveguide bottom wall being defined by the narrow inner back surface of the respective waveguide column and the rear side of the housing with an outer back surface of the waveguide bottom wall being defined by the rear side of the housing; and
an enclosure part holding a number of surrounding parts corresponding to a number of the probe holes, each surrounding part having an outer diameter substantially equal to an inner diameter of the probe holes, and each surrounding part holding a probe connection part of a signal probe, the signal probe being a loop probe having a loop or open ended loop extending outwards from said surrounding part;
wherein the enclosure part is connected to the rear side of the housing with the surrounding parts extending into the probe holes with the loops or open ended loops further extending into a respective interior of the waveguide columns.

2. The antenna array according to claim 1, wherein the signal probes are formed of an electrically conductive material, and are electrically non-conductively secured to the waveguide columns; and
wherein the signal probes are operably disposed in each or at least part of the waveguide columns for emitting and/or receiving an electromagnetic signal having a free-space wavelength of $\lambda_0$, the electromagnetic signal propagates within the waveguide columns holding the signal probes as electromagnetic waves with a corresponding guided signal wavelength $\lambda_g$, and wherein the loop or open ended loop of the respective loop probes at least partly forms a loop circle having a circumference in the range of ⅓ to ⅔, such as ½ of the guided signal wavelength $\lambda_g$.

3. The antenna array according to claim 1, wherein an electrically non-conductive material surrounds the probe connection part extending within the waveguide bottom wall, and wherein the electrical non-conductive material comprises or is made of Polyether Ether Ketone (PEEK) plastic.

4. The antenna array according to claim 1, wherein the enclosure part holds a printed circuit board (PCB), and an end part of the connection part of each of the loop probes is electrically connected to a corresponding electrical conductive signal trace provided at the PCB.

5. The antenna array according to claim 4, wherein the PCB has a bottom surface facing the enclosure part, said enclosure part being formed of an electrical conductive material, such as aluminum, and said PCB bottom surface holding electrical conductive ground traces or parts providing an electrical connection to the enclosure part, and wherein the PCB signal traces, to which the loop probes are electrically connected, are provided at a front surface of the PCB, said front surface facing away from the outer back surface of the waveguide bottom wall.

6. The antenna array according to claim 1, wherein each of the loop probes are disposed proximal to the lower end of the respective waveguide column holding the probe, and wherein the loop or open ended loop of the loop probes is arranged in a direction perpendicular to the longitudinal direction of the waveguide columns; and
    wherein at least one of the waveguide columns has an absorbing load at its upper end to enable the waveguide column to function in a travelling wave mode.

7. A method of arranging a number of signal probes within a cavity slotted-waveguide antenna array, said method comprising:
    providing an array of waveguide columns disposed in parallel in a predetermined adjacent position with respect to one another in a housing having a front side and a rear side with several of the waveguide columns being provided with a plurality of cavity slots on the front side of said housing, said waveguide columns having upper and lower ends, and said waveguide columns being waveguides with a rectangular cross section, with each of the waveguide columns being defined by two opposing wide inner surfaces, a narrow inner back surface, and a narrow inner front surface, with the plurality of cavity slots extending from the front side of the housing to said narrow inner front surface, and wherein each of the waveguide columns has a probe hole formed in a waveguide bottom wall being defined by the narrow inner back surface of the respective waveguide column and the rear side of the housing with an outer back surface of the waveguide bottom wall being defined by the rear side of the housing;
    providing an enclosure part holding a number of surrounding parts corresponding to a number of the probe holes, each surrounding part having an outer diameter substantially equal to an inner diameter of the probe holes, and each surrounding part holding a probe connection part of a signal probe, said signal probe being a loop probe having a loop or open ended loop extending outwards from said surrounding part; and
    connecting the enclosure part to the rear side of the housing with the surrounding parts extending into the probe holes, and with the loops or open ended loops further extending into a respective interior of the waveguide columns.

8. The method according to claim 7, wherein an electrically non-conductive material surrounds the probe connection part extending through said surrounding part; and
    wherein the enclosure part holds a printed circuit board (PCB), and an end part of the connection part of each of the loop probes is electrically connected to a corresponding electrical conductive signal trace provided at the PCB.

* * * * *